United States Patent [19]

Press

[11] Patent Number: 4,854,611
[45] Date of Patent: Aug. 8, 1989

[54] FAIL-SAFE BELLOWS ASSEMBLY

[75] Inventor: Irving D. Press, West Orange, N.J.

[73] Assignee: Unidynamics Corporation, New York, N.Y.

[21] Appl. No.: 100,467

[22] Filed: Sep. 24, 1987

[51] Int. Cl.$^4$ .............................................. F16L 35/00
[52] U.S. Cl. ......................................... 285/3; 285/14;
285/93; 285/114; 285/226; 285/301
[58] Field of Search ................. 285/114, 93, 299, 300, 285/301, 226, 229, 13, 14, 3

[56] References Cited

U.S. PATENT DOCUMENTS

| | | | |
|---|---|---|---|
| 1,726,483 | 8/1929 | Giesler | 285/301 X |
| 2,983,961 | 5/1961 | Titterton et al. | 264/506 |
| 3,001,801 | 9/1961 | Downing | 285/13 |
| 3,219,365 | 11/1965 | Webb | 285/114 X |
| 3,976,312 | 8/1976 | Murphree | 285/93 X |
| 4,023,832 | 5/1977 | Legille | 285/114 X |
| 4,027,902 | 6/1977 | Tanikawa | 285/114 |
| 4,221,502 | 9/1980 | Tanikawa | 285/114 X |
| 4,258,938 | 3/1981 | Davy | 285/93 |

FOREIGN PATENT DOCUMENTS

| | | | |
|---|---|---|---|
| 2556229 | 6/1979 | Fed. Rep. of Germany | 285/93 |
| 2310522 | 12/1976 | France | |
| 825464 | 12/1959 | United Kingdom | 285/301 |

Primary Examiner—Dave W. Arola
Attorney, Agent, or Firm—Brooks Haidt Haffner & Delahunty

[57] ABSTRACT

A fail-safe bellows assembly eliminates the usual limit bolts and replaces them with a cylindrical guard that encircles the bellows element with its associated coupling flanges and interconnects said flanges so as to permit a limited safe magnitude of elongation and articulation. The guard is connected to one of said flanges, with a coupling or linking to the other flange that permits the desired safe freedom of movement. In one embodiment one of the flanges has the guard clamped to its periphery while the other flange couples to the guard with pins and apertures. Another embodiment uses pins projecting radially inwardly from the guard at one end, replacing the pins in the flange and cooperating apertures in the guard.

In addition to the guards, an elastic sleeve is joined to the periphery of each flange with a fluid-tight seal, and a vent passage through one flange interconnects the inter-flange space with the exterior for safe discharge of any fluid escaping from the bellows element.

34 Claims, 6 Drawing Sheets

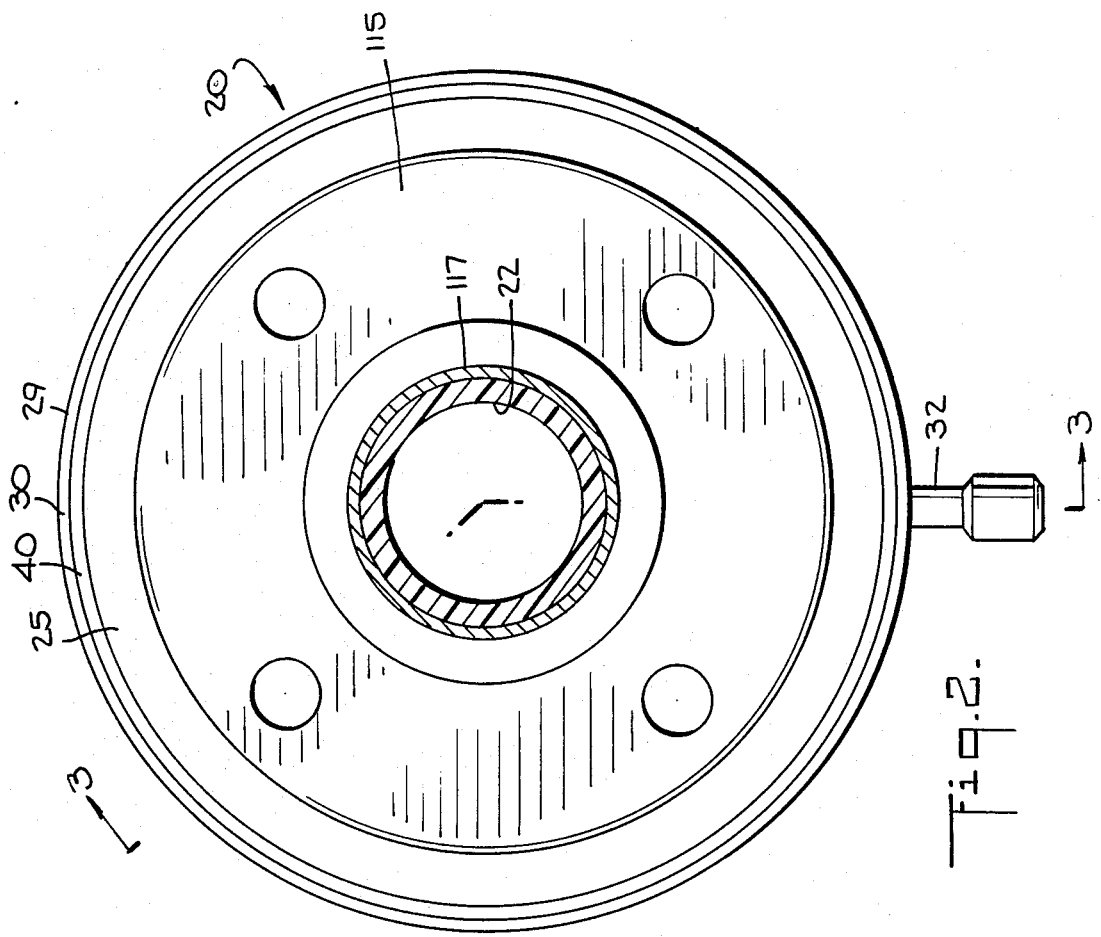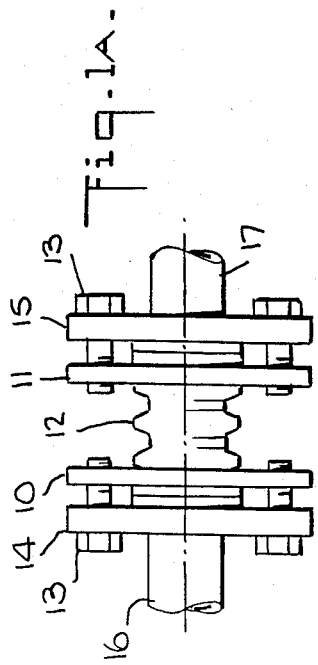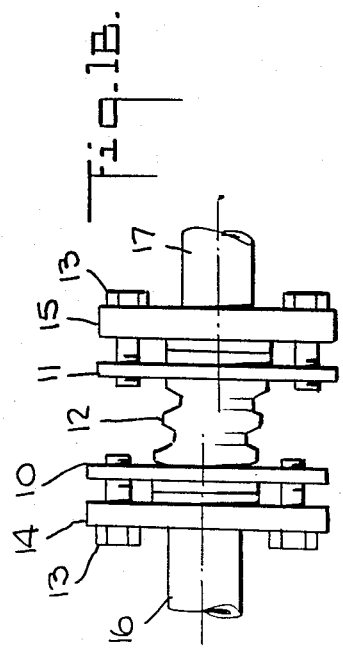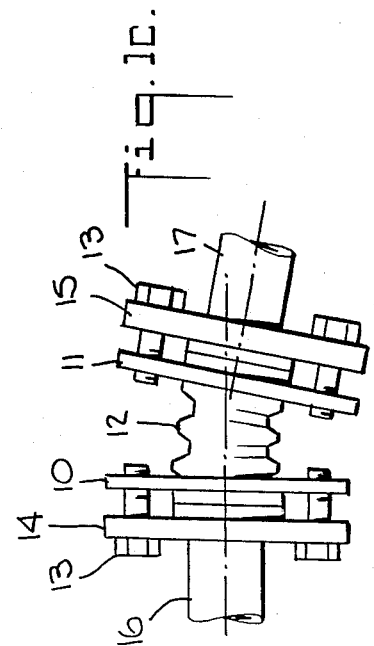

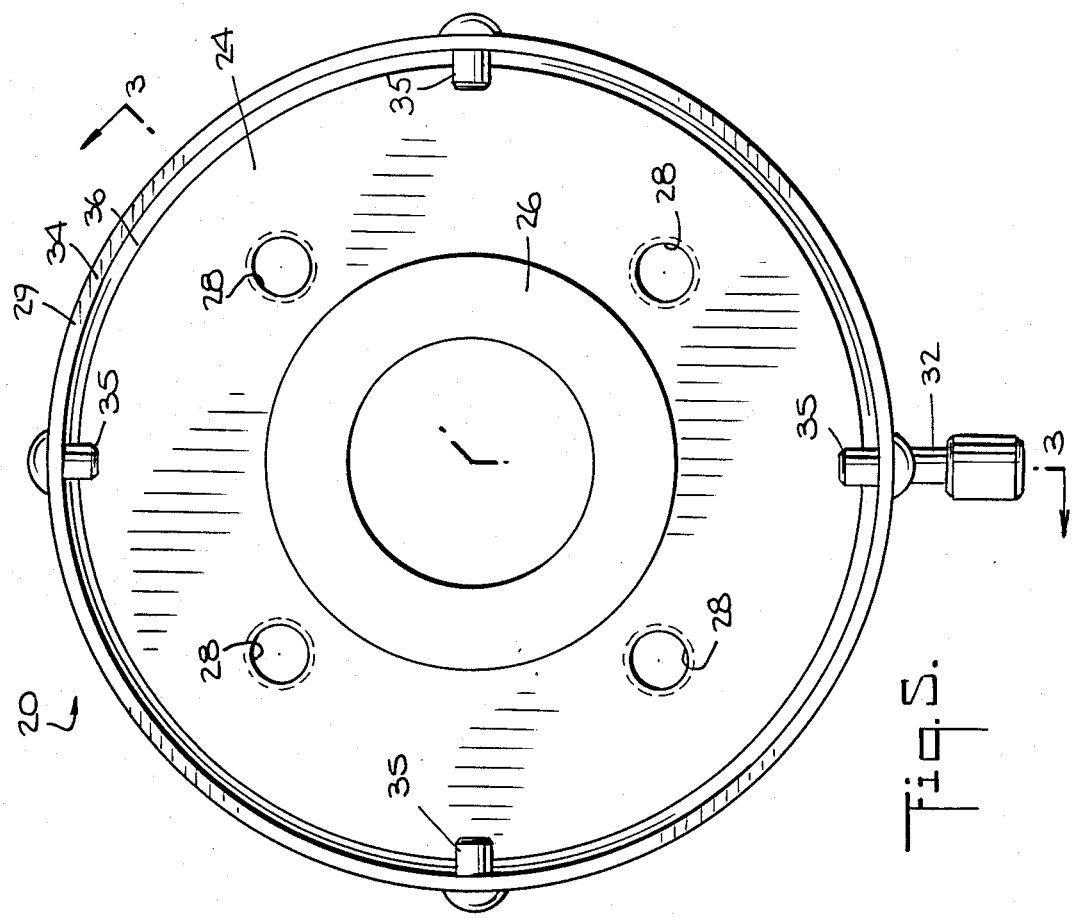
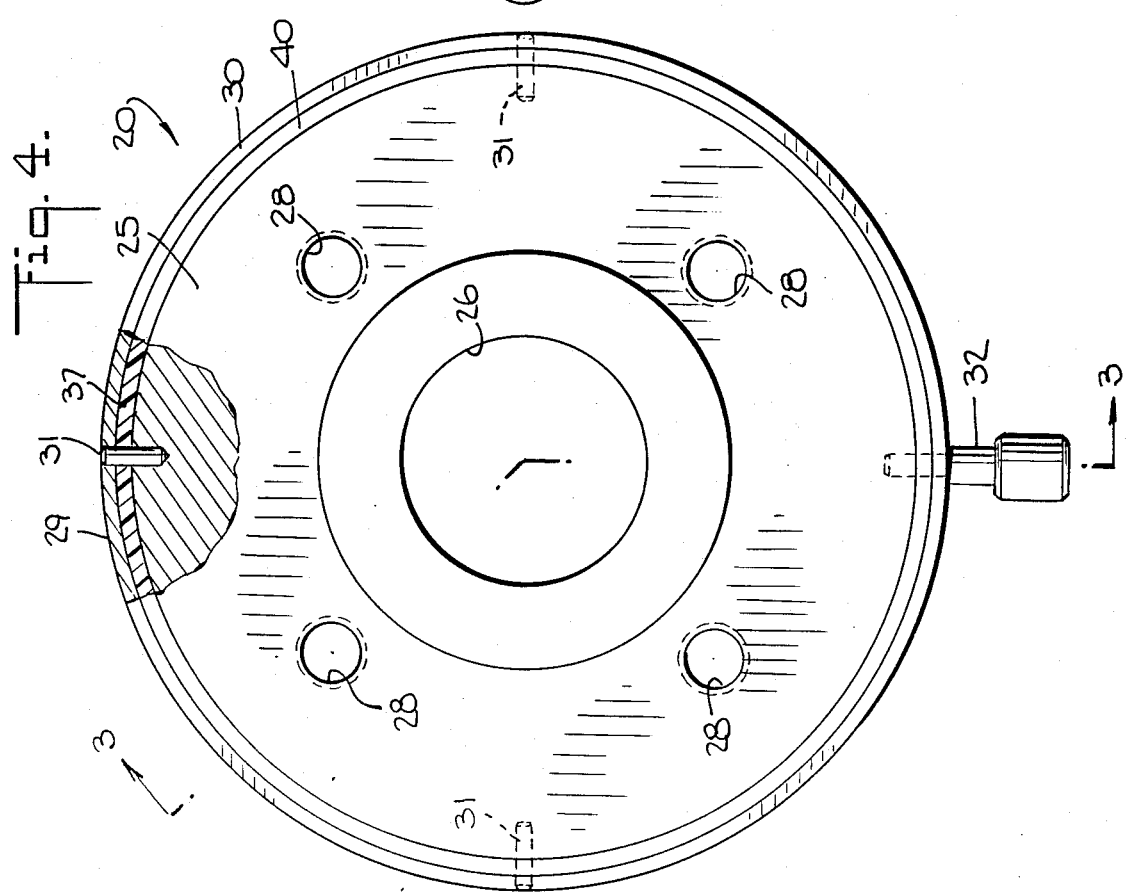

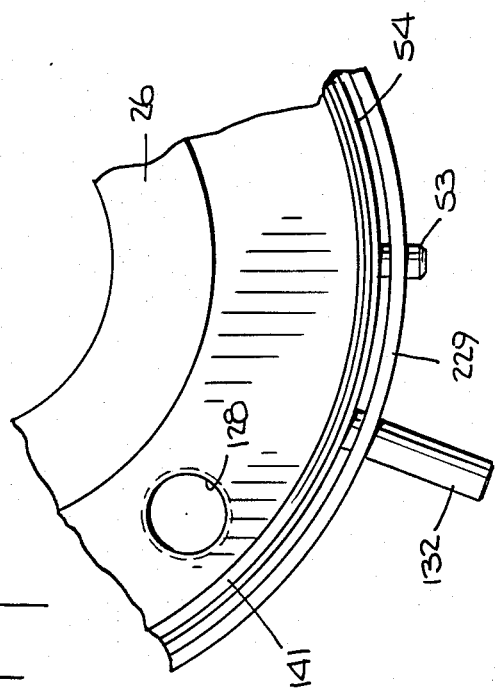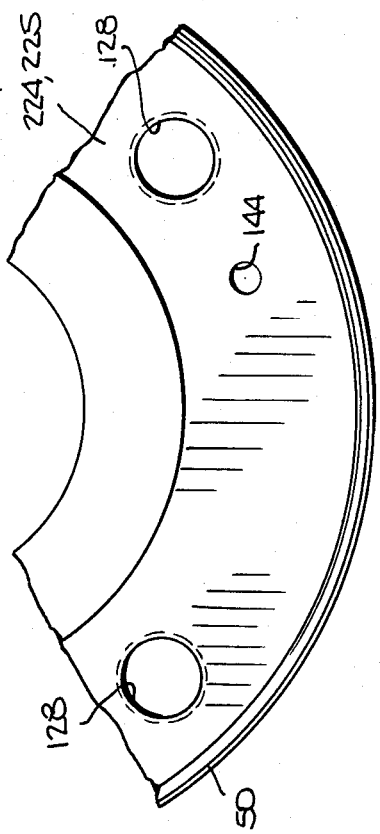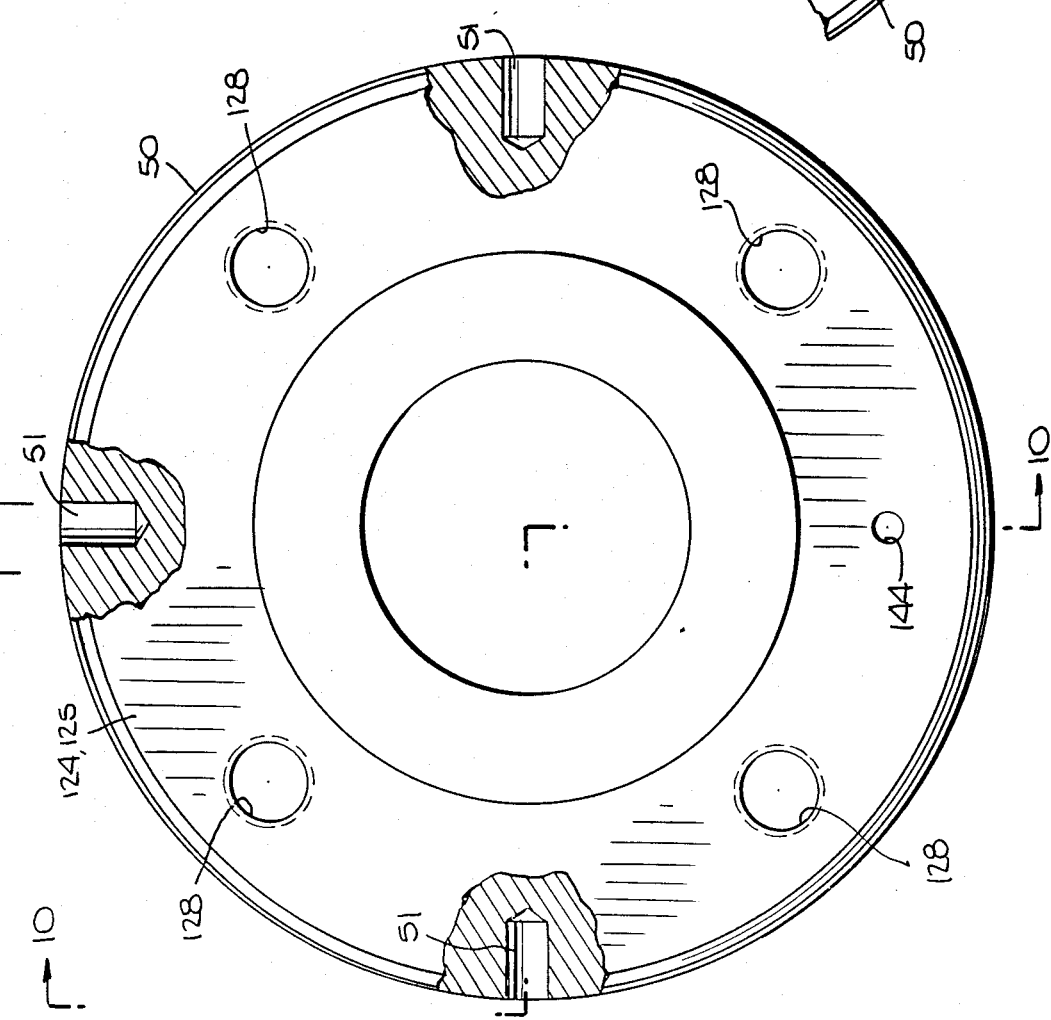

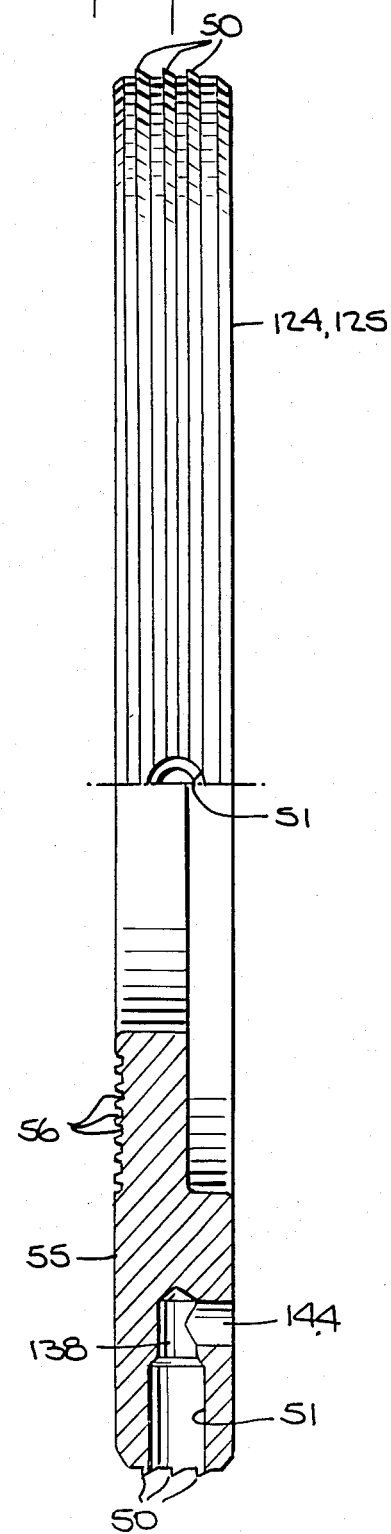
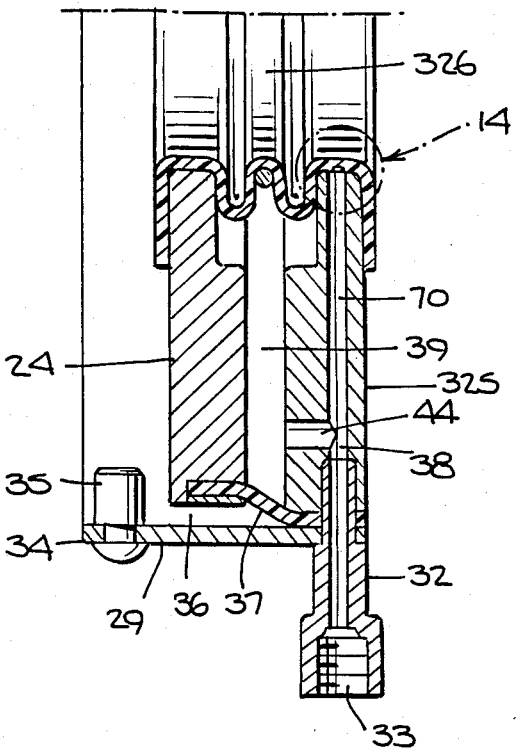
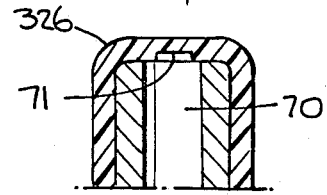

FAIL-SAFE BELLOWS ASSEMBLY

BACKGROUND OF THE INVENTION

The present invention relates to fluid conducting bellows, expansion joints and flexible couplings of the type having spaced apart pipe flanges and a bellows element interconnecting the flanges.

While the present invention has utility in combination with a metal bellows element, its principal application is to bellows elements formed from plastic and/or elastomeric material, and is especially useful with elements formed from polytetrafluoroethylene (PTFE) resin. For simplification of discussion, the expression "bellows assembly" shall be used to designate generically any of the fluid conducting or piping components variously referred to as bellows, expansion joints and flexible couplings.

Bellows assemblies are used in piping systems for various isolation functions, often in association with a pump to isolate the vibration of the latter from the input and output lines. Assemblies having a PTFE bellows element are generally used in piping systems handling caustic or corrosive fluids for which PTFE resin has unique tolerance. However, such use makes it extremely important that gross failure of the bellows element be prevented, or if it cannot be prevented, that some steps be taken to protect personnel and property that might be in the vicinity of a rupturing bellows element.

As a means for minimizing the possibility of bellows failure in use, careful attention has been paid in the past to the use of extreme conservatism in specifying the permissible installation and operating parameters for a given bellows assembly. With flange mounted bellows assemblies it has been customary practice to provide factory installed limit bolts that interconnect the flanges of the bellows assembly and that are secured by lock nuts or the like. In spite of manufacturer admonition to the contrary, installers have been known to remove the limit bolts and subject the bellows assembly to excessive strain in order to bolt it into the plumbing system.

Besides deliberate alteration of the as-manufactured bellows assembly during installation, bellows assemblies are frequently damaged through carelessness or sheer accident between point of manufacture and completion of installation. For example, workers have been known to drop tools on the assemblies or drop the assembly itself where merely a nick in the wrong place can give rise to potential failure.

Aside from faulty installation, there is ever present, for one reason or another, the potential for bellows element failure. For example, there might occur a sudden pressure surge in the line, or the temperature of the fluid might exceed safe limits for the material of which the bellows element is made.

History in the industry has demonstrated that the fears of catastrophic failure are not unfounded. There have occurred numerous failures that have resulted in serious injury to operating personnel.

Thus, the users of such bellows assemblies have resorted to various expedients in an endeavor to improve safety. One expedient takes the form of a piece of fabric that can be wrapped around an installed bellows assembly and is provided with draw strings in opposing hemmed edges for closing the fabric piece at the ends down over the flanges onto the associated pipe sections. The concept assumes that if the bellows element springs a leak or ruptures, the fabric wrapping will prevent fluid from being sprayed around with the possibility of causing injury. Such solution to a significant problem is, at best, only in the nature of a stop-gap measure. Moreover, the fabric wrapping is not a seal and it is not fully effective when a major failure occurs in the underlying bellows. In addition, the fabric wrapping technique involves covering flanges and bolts and tends to trap vapors which are often corrosive and induce corrosion in the bolts. But since the bolts are covered they are not readily inspected. This problem is of sufficient significance that in some establishments the use of fabric wrapping is actually prohibited.

It is, therefore, an object of the present invention to provide a true fail-safe bellows assembly. More specifically, it is an object to provide a bellows assembly whose safety provisions cannot be defeated by the user and which, if the bellows element should fail, whether it be a pin-hole breach or a catastrophic rupture, will safely carry off the escaping fluid in a rigorously controlled manner. At the same time, it is an object of the invention to provide an indication of a leak at its initial stages when a catastrophic failure of the bellows element has not occurred.

It is yet another object of the inventio to provide enhanced freedom of the bellows element from damage by external means.

SUMMARY OF THE INVENTION

In accordance with one aspect of the present invention there is provided a fail-safe bellows assembly comprising in combination with first and second spaced apart pipe flanges and a bellows element interconnecting said flanges, a cylindrical, substantially rigid, form-stable guard encircling said bellows element and flanges, generally concentric therewith, means coupling said guard to said flanges for maintaining said guard in position bridging said space between said flanges and at least partially overlapping each flange around the entire periphery thereof while permitting limited movement of said flanges relative to one another, said limited movement being restricted to a safe magnitude to protect said bellows element against excessive elongation and articulation.

In accordance with another aspect of the present invention the above structure is provided with secondary seal means disposed between the two flanges surrounding the bellows element for cooperation with a vent passage to provide controlled discharge of any fluid entering the space between the flanges of the bellows element.

BRIEF DESCRIPTION OF THE DRAWINGS

The invention will be better understood after reading the following detailed description of the presently preferred embodiments thereof with reference to the appended drawings in which:

FIG. 1 consists of a series of three illustrations, FIGS. 1A, 1B and 1C, showing the three categories of strain to which a bellows assembly can be subjected and to which it is required to accommodate in a piping installation, namely, axial travel, misalignment and angular deflection;

FIG. 2 is an elevational view, with portions in section, of one embodiment of the present invention, as viewed looking along a pipe run toward the bellows assembly;

FIG. 4 is a transverse sectional view taken along the line 4—4 in FIG. 3;

FIG. 5 is a transverse sectional view taken along the line 5—5 in FIG. 3;

FIG. 9 is an elevational view, with portions broken away, of one of the flanges forming a part of the bellows assembly shown in FIG. 6;

FIG. 10 is a quarter sectional view of the side elevation of the flange of FIG. 9, taken along the line 10—10 in the latter figure;

FIG. 11 is a fragmentary view of a portion of the left side of FIG. 6 showing a detail of a modification of the embodiment of FIG. 6 wherein the drain fitting is located circumferentially displaced from connecting pins that are located in quadrature;

FIG. 12 is a fragmentary view of a portion of FIG. 9 showing the modification corresponding to FIG. 11;

FIG. 13 is a fragmentary sectional view similar to FIG. 3 but showing a modification thereof;

FIG. 14 is an enlarged fragmentary view of the area in FIG. 13 that is designated by the phantomed circle 14; and FIG. 15 is an enlarged fragmentary sectional view of fabric reinforced secondary seal material for use as an alternative in the various embodiments illustrated in FIGS. 2 to 14.

The same reference numerals are used throughout the drawings to designate the same or similar parts. Where parts in one embodiment are analogous to parts in another, they are designated by reference numerals differing by a factor of 100 or 200.

DETAILED DESCRIPTION OF THE PRESENTLY PREFERRED EMBODIMENTS

Figure 3:
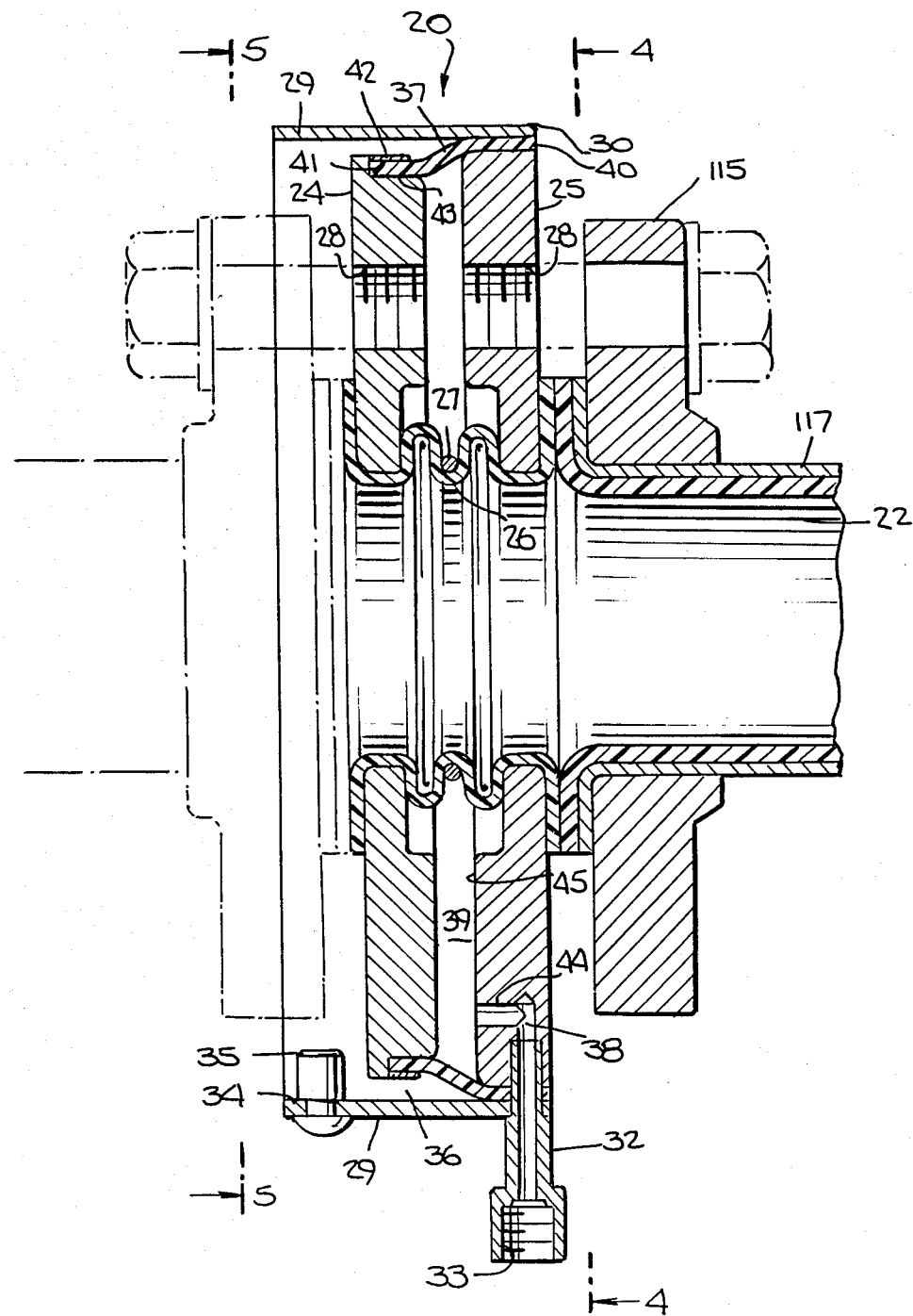
FIG. 3 is a longitudinal sectional view of the embodiment of FIG. 2, taken along the line 3—3 in FIG. 2.

Referring first to FIG. 1A, there is illustrated the basic elements of a bellows assembly as installed between the opposing ends of two sections of pipe. Flanges 10 and 11 joined by bellows element 12 constitute the bellows assembly secured by bolts 13 to pipe flanges 14 and 15 on respective pipe sections 16 and 17. FIG. 1A is intended to illustrate accommodation on the part of the bellows 12 that involves axial travel, i.e., approach and separation of flanges 10 and 11, while maintaining parallelism centered on a common axis. In FIG. 1B, the same bellows assembly is shown accommodating pipe end misalignment wherein the flanges remain parallel but centered on laterally offset axes. In FIG. 1C, the accommodation is to angular deflection wherein the flanges depart from parallelism. The illustration of each of FIGS. 1A, 1B and 1C is of a simple example of the particular relationship. However, in real life the various relationships are generally combined so that compound strain is applied to the bellows assembly. Moreover, these examples are limited to steady state conditions and cannot illustrate the dynamic strains to which the bellows 12 is subjected in use. Such dynamic strains may involve internal pressure fluctuations, vibrational motion between the interconnected pipe sections, and/or thermal expansion and contraction of the pipe sections and associated plumbing.

The illustrations in FIGS. 1A, 1B and 1C are based on bellows with three convolutions. However, throughout the entire specification it should be understood that the number of convolutions shown is intended to be illustrative only. The triple convolute bellows shown in FIG. 1 are convenient for illustrating the stress parameters while the number of convolutes provided in the various embodiments of the invention are dictated by the requirements for the particular bellows assembly and can be varied in known manner as desired.

Because it underscores the value of the present invention, it will be described with reference to a piping system consisting of metal pipe, generally steel, lined with PTFE and capable of handling dangerous fluids. The lining of such pipe usually extends axially outwardly of the metal pipe where it is flared radially outwardly over the face of the corresponding flange. The flared portion of the lining thus provides a gasket for compression and seal development between said corresponding flange and a mating flange to which it is bolted.

Referring to FIGS. 2 to 5, there is illustrated a first embodiment of the bellows assembly constructed in accordance with the present invention. The bellows assembly, designated generally by the reference numeral 20, is intended to be inserted between confronting flanges in a metal piping system that has been lined with PTFE resin. Only so much of the associated piping, such as pipe 117, its lining 22, and its connecting flange 115, is shown in the drawings as is believed necessary to show the interrelationship of the assembly 20 to the piping.

The bellows assembly 20 consists of spaced apart pipe flanges 24 and 25 interconnected by a bellows element 26, the latter having been molded from PTFE resin with an external metal reinforcing ring 27 using any suitable method such as that described in Titterton et al. U.S. Pat. No. 2,983,961. The flanges 24 and 25 are each provided with suitable threaded bolt holes 28 distributed in conventional manner thereabout.

A cylindrical substantially rigid form-stable guard 29, for example, of metal, is provided encircling the bellows element 26 and flanges 24 and 25, generally concentric therewith. In this embodiment the guard has a uniform diameter throughout its axial extent and is secured at its end 30 to the periphery of the flange 25 by means of a series of pins designated 31 and 32, the latter being hollow and configured as a fitting with an internally threaded bore 33 for receiving a suitable hose or tube coupling (not shown). At the opposite end 34 of the guard 29 there are secured a series of circumferentially spaced pins 35, in this instance rivet-shaped, that project radially inwardly and are suitably upset, as best seen in FIGS. 3 and 5 to prevent removal. The projecting length of a pin 35 after being upset should be greater than twice the clearance 36 between the guard 29 and the closest point on flange 24 when the guard 29 and flange 24 are both centered on a common axis. The pins 35 will therefore be able to restrict the movement of flange 24 to a confined space within guard 29. The limits placed on the movement of flange 24 are those considered safe and sufficient to protect bellows element 26 against excessive elongation and articulation. Such limits are a function of the clearance 36 and the axial length of guard 29 in combination with the spacing of the pins 35 from the end 34 of guard 29.

While the guard 29 will always bridge the space between the flanges 24 and 25, and therefore can bar radial projection of escaping fluid if the bellows element 26 should fail, gross area discharge can still be anticipated through clearance 36 over the flange 24. To avoid this happening and provide for more satisfactory control, secondary seal means in the form of an elastic sleeve 37 is disposed between the flanges 24 and 25 surrounding the bellows element 26 for cooperation with a vent passage 38 that includes the bore through pin fitting 32. This arrangement provides for controlled discharge of any fluid entering the space 39 between the flanges 24 and 25 upon catastrophic rupture or lesser failure or breach of element 26.

The elastic sleeve 37 is joined at its end 40 to the flange 25 by virtue of its being sandwiched between the periphery of flange 25 and the overlying guard 29 as well as being penetrated by the pins 31 and 32. The other end 41 of sleeve 37 is secured in the illustrated embodiment by a swaged down metal band 42 clamping the end 41 to the periphery of flange 24 within a rabbet 43. The sleeve 37 is formed from a suitable elastomeric material with sufficient flexibility and elasticity to accommodate the limited movement permitted to the flanges 24 and 25. However, for the assembly to afford protection, the seal sleeve 37 must resist rupture or blowing out through the gap 36. If necessary, sleeve 37 should be fabric reinforced as shown by way of example in FIG. 15 where fabric layer 46 is sandwiched between elastomeric layers 47.

It should be apparent that the vent passage 38 comprises a first passage, i.e., the bore through pin fitting 32, that extends through both the guard 29 and elastic sleeve 37 radially inwardly into the flange 25; and that a second passage, namely passage 44, is formed in flange 25 intercepting the passage through pin fitting 32, with the mouth of passage 44 communicating with the face 45 of flange 25, which face confronts space 39 existing between the flanges 24 and 25. As illustrated in the drawings, it is intended that the bellows assembly 20 should be installed in a piping system oriented with pin fitting 32 pointed downward. This insures that for a slow leak through bellows elements 26, fluid will quickly accumulate in space 39 to the level of passage 44 and discharge through passage 38 and bore 33. Such discharge will be readily detectable so remedial action can be taken. On the other hand if the element 26 experiences gross failure, the fluid discharge under pressure through passage 38 will be directed downward in a harmless manner. If desired, a suitable drain line can be connected to the fitting 32.

The embodiment just described suffers from the drawback that flanges 24 and 25 are not of the same size and that the overall envelope of the assembly is significantly greater than the diameter of the associated standard pipe flanges. The diameter of guard 29 is dictated by a series of design considerations. First, clearance 36 must be adequate to provide the required degree of freedom for the inter-flange motion of the bellows element. Given a particular dimension for clearance 36, the pins 35 must have the requisite length. Then, as evident from the location of the proximate pipe flange (shown in phantom lines in FIG. 3) sufficient clearance must be allowed between such flange and the pins 35.

Fortunately, these constraints can be avoided by resorting to the modified embodiment shown with reference to FIGS. 6 to 10, to which attention should now be directed. For purpose of simplification, FIGS. 6–10 illustrate only the bellows assembly, designated generally by the reference numeral 120, and omit all showing of the adjacent pipe and pipe flanges to which it would be connected in use. For such relationship, reference may be had to FIG. 3, the combination being similar.

The bellows assembly 120 consists of spaced apart pipe flanges 124 and 125, the details of which are shown in FIGS. 9 and 10, both flanges being identical except for the possible omission of the vent passage from flange 125. However, for the reason to be described below, the flange 125 can be identical to flange 124 even to the extent of including the vent passage.

Figure 6:
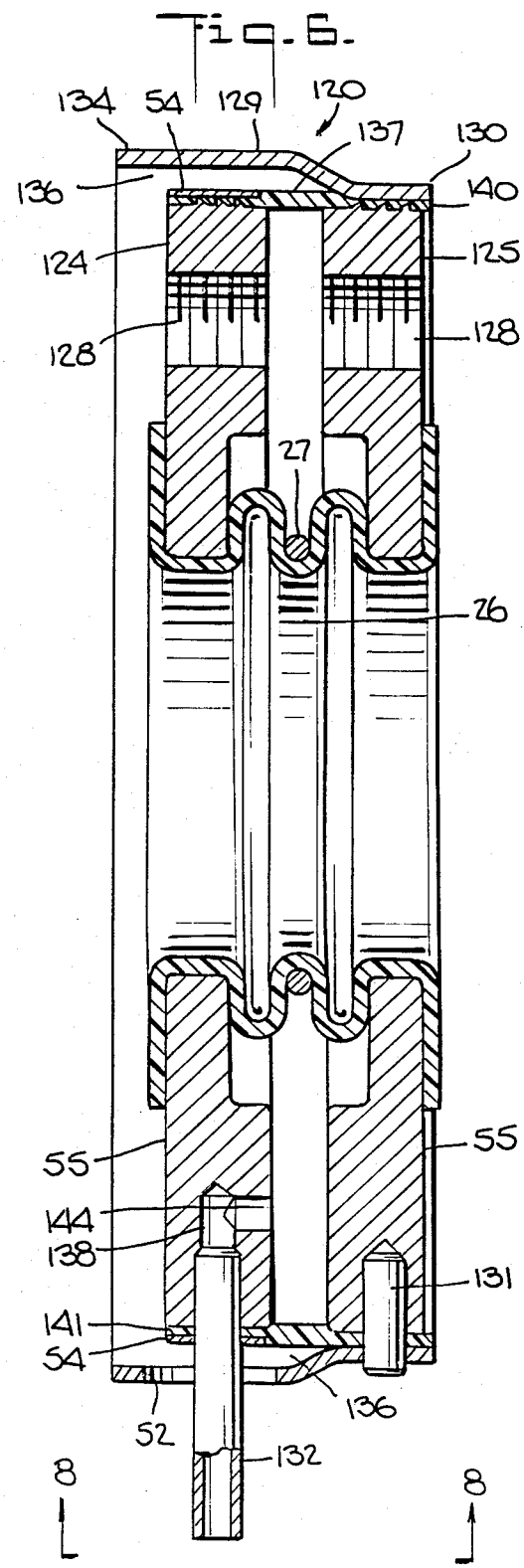
FIG. 6 is a sectional view similar to that of FIG. 3 but showing the construction of a modified embodiment of the invention.

The flanges 124 and 125 are interconnected by the bellows element 26 that is reinforced by ring 27. A series of threaded bolt holes 128 are provided in each of flanges 124 and 125 distributed in conventional manner thereabout. The cylindrical substantially rigid form-stable guard 129, e.g., of metal, is provided encircling bellows element 26 and flanges 124 and 125, generally concentric therewith. In this embodiment the guard has a stepped diameter, and being of metal, is swaged down at its end 130 to clamp the end 140 of elastomeric sleeve 137 to the periphery of flange 125, which flange is provided with a plurality of annular barbs 50, best seen in FIG. 10. In addition, the swaged down end 130 of guard 129 is secured to the periphery of the flange 125 by means of a series of pins designated 131, similar to the pins 31 of FIG. 3, which pins (only one of which is seen in FIG. 6) pass through the guard 129 and the sleeve 137 where they are received with a force fit in the circumferentially distributed bores 51 in flange 125. See FIGS. 9 and 10.

If flanges 124 and 125 are identical, then one of the bores 51 will be in communication with passages 138 and 144. When that bore 51 is provided with a hollow pin 132, as shown in FIG. 6, the passages cooperate to provide the vent passage for flange 124. However, when serving as flange 125, the passages 138 and 144 can be plugged by a solid pin 131 in the associated bore 51. As illustrated in FIG. 6, the passages 138 and 144 have been omitted from flange 125, but if present would appear as a mirror image of the like passages in flange 124, although not necessarily at the same circumferential location relative to the assembly 120.

Figure 7:
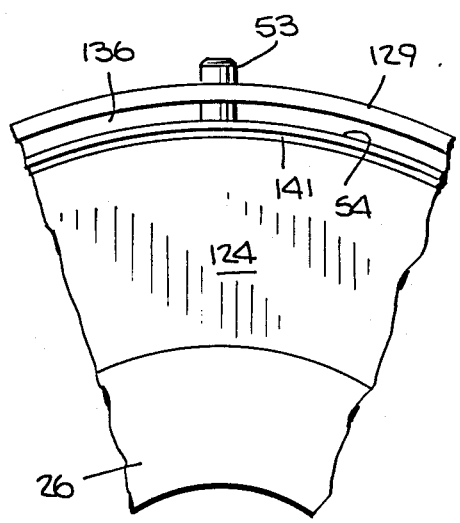
FIG. 7 is a fragmentary view of a portion of the left side of FIG. 6 showing a detail not visible in FIG. 6.
Figure 8:
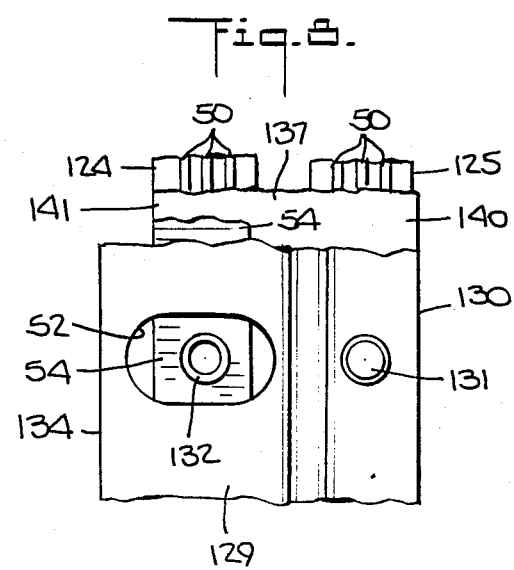
FIG. 8 is a fragmentary sectional view taken along the line 8—8 in FIG. 6.

The embodiment of FIGS. 6 to 10 differs further from that of FIG. 3 in that the means coupling the guard 129 to the flange 124 comprises a plurality of circumferentially spaced apertures 52 formed in the guard 129, and a corresponding number of pin-shaped members 53, one of which is shown in FIG. 7, mounted at the periphery of flange 124, installed in bores 51, and sufficiently longer than pins 131 to extend radially outwardly through a corresponding one of each of the apertures 52, with the exception of that apertures 52 that is provided with the pin 132. The pin 132 projects further from guard 129 to permit connection of a suitable fluid drain line, if desired. Similar to FIG. 3, there are three pins 53 and one pin 132 equally spaced around flange 124 alternating with the four equally spaced bolt holes 128. In flange 125 there are four pins 131 so spaced around the flange. A metal band 54, penetrated by the pins 53 and 132, is swaged down over the end 141 of sleeve 137 to compress the end 141 against the barbs 50 on the periphery of flange 124 and thereby cooperate with pins 53 and 132 to secure sleeve 137 to flange 124. The arrangement for securing sleeve 137 to flanges 124 and 125 is intended to provide a fluid seal therebetween in addition to a mechanical anchor.

Although shown only in FIG. 10, both flanges 124 and 125 are preferably provided on the face 55, which is overlapped by the flares of the bellows 26, with a plurality of circular grooves 56 to ensure an adequate grip on the flares of the bellows element to resist pulling out when the flanges 124 and 125 are drawn apart in an installation, putting tension on bellows 26. Such grooves may also be employed advantageously in the embodiment of FIG. 3.

In the bellows assembly 120, replacement of the rivet pins 35 of FIG. 3 by the pins 53, 132 and apertures 52 permits reducing significantly the overall envelope dimension of the assembly. Although the clearance 136 between the radially enlarged end 134 of guard 129 and the underlying band 54 is substantially the same as the clearance 36 in FIG. 3, the inside diameter of guard end 134 can be reduced to that corresponding to the innermost point of pin 35 in FIG. 3, maintaining the same degree of freedom of movement relative to the pipe flange to which bellows assembly 120 will be connected. It should be apparent that the relationship between the dimensions of the apertures 52 and the dimensions of the pin-shaped members 53 and 132 will establish certain aspects of the freedom of movement of the bellows, and will cooperate to permit and establish limited movement between the flanges.

In the embodiments of the invention that have been described above, venting is implemented by replacing with a hollow pin one of four solid pins spaced equally circumferentially of the associated pipe flange. See pin 32 in FIGS. 2 to 5 and pin 132 in FIGS. 6 to 10. However, if greater mechanical strength is desired it may be found advantageous to offset the hollow pin 32 or 132 approximately 22½° as shown in FIGS. 11 and 12 while locating a solid pin 31 or 53 at the quadrature point relative to the companion pins 31 or 53. Referring to FIGS. 11 and 12, hollow pin 132 with intersecting passage 144 is located mid-way between bolt hole 128 and pin 53 in flange 224 or 225, the flanges being similar to flanges 124 and 125, respectively.

With regard to the several embodiments of the invention that have been described above, it has been assumed that failure of the bellows element 26 will occur in the convoluted section between the flanges. The leaking fluid will then fill the cavity between the flanges, contained by the elastomeric sleeve 37 or 137, reinforced, if necessary, as shown in FIG. 15, and will discharge through the vent passage. However, it may be desirable to provide means for encouraging failure, if it must occur, at least in the presence of excessive fluid line pressure, to occur in a predetermined location. Referring to FIGS. 13 and 14, there is shown a portion of FIG. 3 containing a passage extension 70 in the flange 325 extending all the way to the inside diameter surface of the flange. At this point the wall of bellows element 326 is reduced in thickness by circumscribing the wall with a channel or groove 71 (see FIG. 14). Therefore, if there should arise an increase in pressure of the fluid passing through the bellows element 326, which pressure exceeds a predetermined magnitude, the thinned wall of element 326 at the base of channel 71 will rupture permitting the fluid to escape directly into passage extension 70 and out through fitting 32.

While the modification of FIGS. 13 and 14 has been illustrated as applied to the embodiment of FIG. 3, it should be understood that the modification can also be applied to the embodiment of FIG. 6. Also, while it is presently preferred to construct the guards 29, 129 and 229 of metal, for certain installations, if desired, the guards can be constructed of other substantially rigid form stable material such as a rigid plastic or a plastic reinforced with fiberglass or other suitable material. A ceramic guard might be useful under certain conditions. The important consideration is that the guard have sufficient strength to limit the motion of the bellows assembly, and to prevent blow-out of the secondary seal if the primary bellows should fail.

An additional advantage provided by the embodiments of FIGS. 6 to 12, wherein the degree of permitted articulation is provided by the relation between the flange-borne pins and the cooperating apertures in the guards 129 and 229, is that an observer can visually observe the position of each pin in its associated guard aperture after the assembly is installed and determine the extent of any misalignment, angular deflection, extension or contraction and thereby judge how much additional leeway is provided for absorbing strain. If desired, indicia or index marks can be placed around each of the apertures 52 on the outer surface of guard 129 or 229 to aid the observer in detecting departure from a neutral position.

Having described the presently preferred embodiments of the invention, it is to be understood that various changes in construction can be effected by those skilled in the subject art without departing from the true spirit of the invention as defined in the appended claims.

What is claimed is:

1. A fail-safe bellows assembly comprising in combination with first and second spaced apart pipe flanges and a bellows element interconnecting said flanges, a cylindrical substantially rigid, form-stable guard completely encircling said bellows element and flanges, generally concentric therewith, the inside diameter of said guard where it overlies one of said flanges being sufficiently larger than the outside diameter of said one flange to permit both lateral misalignment and angular deflection between said flanges, means coupling said guard to said flanges for maintaining said guard in position bridging the space between said flanges and at least partially overlapping each flange around the entire periphery thereof while permitting said lateral misalignment and angular deflection as well as limited axial movement of said flanges relative to one another, said limited movement being restricted to a safe magnitude to protect said bellows element against excessive elongation and articulation.

2. A fail-safe bellows assembly according to claim 1, wherein secondary seal means is disposed within said cylindrical guard in fluid sealing relationship between said two flanges surrounding said bellows element and defining an enclosed space between said bellows element and said secondary seal means, a vent passage establishing communication between said enclosed space and the exterior of said bellows assembly, said secondary seal means cooperating with said vent passage to provide controlled discharge of any fluid entering said enclosed space between said flanges of said bellows element.

3. A fail-safe bellows assembly according to claim 2, wherein said vent passage comprises a first passage extending through said guard radially inwardly into one of said flanges, and a second passage formed in said one flange intercepting said first passage and having a mouth communicating with that face of said one flange that confronts said enclosed space between the flanges.

4. A fail-safe bellows assembly according to claim 3, wherein said vent passage includes a further passage section extending radially inwardly within said flange through to the inside diameter thereof, and said bellows element has a weakened wall region lying directly over said further passage section where said further passage opens on said inside diameter, whereby said bellows is induced to rupture within said region in response to excessive internal fluid pressure for channeling overpressure fluid directly into said vent passage.

5. A fail-safe bellows assembly according to claim 4, wherein said means coupling said guard to said flanges comprises a plurality of apertures formed in said guard and distributed circumferentially thereabout overlying said one of said flanges, and a corresponding number of pin-shaped members each mounted at the periphery of said one flange, said pin-shaped members on said one flange being spaced circumferentially about the flange and each extending radially outwardly through a corresponding one of said apertures.

6. A fail-safe bellows assembly according to claim 2, wherein said vent passage comprises a first passage extending through said guard radially inwardly into one of said flanges, and a second passage formed in said one flange intercepting said first passage and having a mouth communicating with that face of said one flange that confronts said enclosed space between the flanges.

7. A fail-safe bellows assembly according to claim 6, wherein said means coupling said guard to said flanges comprises a plurality of apertures formed in said guard and distributed circumferentially thereabout overlying said one of said flanges, and a corresponding number of pin-shaped members each mounted at the periphery of said one flange, said pin-shaped members being spaced circumferentially about said one flange and each extending radially outwardly through a corresponding one of said apertures.

8. A fail-safe bellows assembly according to claim 7, wherein said first passage is constituted at least in part by a through bore passing through one of said pin-shaped members.

9. A fail-safe bellows assembly according to claim 2, wherein said secondary seal means comprises an elastic sleeve joined at opposite ends to a respective one of said flanges for enclosing said enclosed spaced between said flanges while accommodating said limited movement of said flanges.

10. A fail-safe bellows assembly according to claim 9, wherein said elastic sleeve is secured to and about the periphery of the respective flange in fluid sealing engagement therewith.

11. A fail-safe bellows assembly according to claim 10, wherein a metallic band-like member surrounds said elastic sleeve about each of said flanges and compresses the underlying portion of said elastic sleeve against the periphery of the corresponding flange.

12. A fail-safe bellows assembly according to claim 11, wherein said band-like member that is associated with one of said flanges is a portion of said guard.

13. A fail-safe bellows assembly according to claim 11, wherein said means coupling said guard to said flanges comprises a plurality of apertures formed in said guard and distributed circumferentially thereabout overlying said one of said flanges, and a corresponding number of pin-shaped members each mounted at the periphery of said one, said pin-shaped members being spaced circumferentially about said one flange and each extending radially outwardly through a corresponding one of said apertures.

14. A fail-safe bellows assembly according to claim 9, wherein said vent passage comprises a first passage extending through both said guard and said elastic sleeve radially inwardly into one of said flanges, and a second passage formed in said one flange intercepting said first passage and having a mouth communicating with that face of said one flange that confronts said enclosed space between the flanges.

15. A fail-safe bellows assembly according to claim 14, wherein said means coupling said guard to said flanges comprises a plurality of apertures formed in said guard and distributed circumferentially thereabout, overlying said one of said flanges, and a corresponding number of pin-shaped members each mounted at the periphery of said one flange, said pin-shaped members on said flange being spaced circumferentially about the flange and each extending radially outwardly through a corresponding one of said apertures.

16. A fail-safe bellows assembly according to claim 15, wherein said first passage is constituted at least in part by a through bore passing through one of said pin-shaped members.

17. A fail-safe bellows assembly according to claim 16, characterized in that said guard has a substantially uniform inside diameter throughout its length.

18. A fail-safe bellows assembly according to claim 17, wherein said elastic sleeve is secured to and about the periphery of the respective flange in fluid sealing engagement therewith.

19. A fail-safe bellows assembly according to claim 18, wherein a metallic band-like member surrounds said elastic sleeve about each of said flanges and compresses the underlying portion of said elastic sleeve against the periphery of the corresponding flange.

20. A fail-safe bellows assembly according to claim 19, wherein said band-like member that is associated with one of said flanges is a portion of said guard.

21. A fail-safe bellows assembly according to claim 20, wherein said vent passage includes a further passage section extending radially inwardly within said flange through to the inside diameter thereof, and said bellows element has a weakened wall region lying directly over said further passage section where said further passage opens on said inside diameter, whereby said bellows is induced to rupture within said region in response to excessive internal fluid pressure for channeling overpressure fluid directly into said vent passage.

22. A fail-safe bellows assembly according to claim 1, wherein said means coupling said guard to said flanges comprises a plurality of apertures formed in said guard and distributed circumferentially thereabout overlying said one of said flanges, and a corresponding number of pin-shaped members each mounted at the periphery of said one flange, said pin-shaped members being spaced circumferentially about said one flange and each extending radially outwardly through a corresponding one of said apertures.

23. A fail-safe bellows assembly according to claim 22, wherein said pin-shaped members project a sufficient distance radially beyond the periphery of said one flange to remain within the corresponding guard aperture in spite of maximum attainable lateral offset of the guard axis relative to the axis of said one flange.

24. A fail-safe bellows assembly according to claim 23, wherein said apertures in the guard are sufficiently larger than the outside dimensions of the corresponding pin-shaped members to permit and establish said limited movement between said flanges.

25. A fail-safe bellows assembly according to claim 22, wherein secondary seal means is disposed within said cylindrical guard in fluid sealing relationship between said two flanges surrounding said bellows element and defining an enclosed space between said bellows element and said secondary seal means, a vent passage establishing communication between said enclosed space and the exterior of said bellows assembly, said secondary seal means cooperating with said vent passage to provide controlled discharge of any fluid entering said enclosed space between said flanges.

26. A fail-safe bellows assembly according to claim 25, wherein said pin-shaped members project a sufficient distance radially beyond the periphery of said one flange to remain within the corresponding guard aperture in spite of maximum attainable lateral offset of the guard axis relative to the axis of said one flange.

27. A fail-safe bellows assembly according to claim 26, wherein said apertures in the guard are sufficiently larger than the outside dimensions of the corresponding pin-shaped members to permit and establish said limited movement between said flanges.

28. A fail-safe bellows assembly according to claim 25, wherein said secondary seal means comprises an elastic sleeve joined at opposite ends to a respective one of said flanges for enclosing said enclosed space between said flanges while accommodating said limited movement of said flanges.

29. A fail-safe bellows assembly according to claim 28, wherein said elastic sleeve is secured to and about the periphery of the respective flange in fluid sealing engagement therewith.

30. A fail-safe bellows assembly according to claim 28, wherein said pin-shaped members project a sufficient distance radially beyond the periphery of said one flange to remain within the corresponding guard aperture in spite of maximum attainable lateral offset of the guard axis relative to the axis of said one flange.

31. A fail-safe bellows assembly according to claim 30, wherein said apertures in the guard are sufficiently larger than the outside dimensions of the corresponding pin-shaped members to permit and establish said limited movement between said flanges.

32. A fail-safe bellows assembly according to claim 1, wherein said guard has a substantially uniform inside diameter throughout its length.

33. A fail-safe bellows assembly comprising in combination with first and second pipe flanges and a bellows element interconnecting said flanges, a cylindrical substantially rigid form-stable guard completely encircling said bellows element and flanges generally concentric therewith and having a first end coupled to the periphery of said first flange and extending toward and over said second flange, the length of said guard being related to the maximum permissible extension of said bellows such that when said bellows is maximally extended a second end of said guard will at least partially overlap the periphery of said second flange, said guard having a sufficiently larger inside diameter at its second end than the outside diameter of said second flange periphery to permit both lateral misalignment and angular deflection between said flanges, and means disposed between said guard and said second flange for limiting movement between said guard and said second flange to restrict the elongation and articulation of said bellows element to a safe magnitude.

34. A fail-safe bellows assembly according to claim 33, wherein secondary seal means is disposed within said cylindrical guard in fluid sealing relationship between said two flanges surrounding said bellows element and defining an enclosed space between said bellows element and said secondary seal means, a vent passage establishing communication between said enclosed space and the exterior of said bellows assembly, said secondary seal means cooperating with said vent passage to provide controlled discharge of any fluid entering said enclosed space between said flanges.

* * * * *

UNITED STATES PATENT AND TRADEMARK OFFICE
CERTIFICATE OF CORRECTION

PATENT NO. : 4,854,611
DATED : August 8, 1989
INVENTOR(S) : Irving D. Press

It is certified that error appears in the above-identified patent and that said Letters Patent is hereby corrected as shown below:

Column 2, line 26, "inventio" should read --invention--.
       Column 9, line 46, "spaced" should read --space--; line 67, after "one" and before the comma (,) there should be inserted --flange--.

Signed and Sealed this

Twelfth Day of June, 1990

Attest:

HARRY F. MANBECK, JR.

*Attesting Officer*     *Commissioner of Patents and Trademarks*